(12) United States Patent
Kawamura (10) Patent No.: US 6,764,311 B2
(45) Date of Patent: Jul. 20, 2004

(54) SYSTEM AND METHOD FOR TRAINING/ MANAGING BASIC ABILITY

(76) Inventor: Akihiro Kawamura, 405-8, Minami-iizuka, Oamishirasato-machi, Sanbu-gun, Chiba-ken (JP)

( * ) Notice: Subject to any disclaimer, the term of this patent is extended or adjusted under 35 U.S.C. 154(b) by 497 days.

(21) Appl. No.: 09/940,535

(22) Filed: Aug. 29, 2001

(65) Prior Publication Data

US 2002/0061507 A1 May 23, 2002

(30) Foreign Application Priority Data

Aug. 29, 2000 (JP) ..................................... P2000-258887

(51) Int. Cl.[7] .......................... G09B 25/00; G09B 3/00
(52) U.S. Cl. ........................................ 434/379; 434/322
(58) Field of Search ................................. 434/379, 322

(56) References Cited

U.S. PATENT DOCUMENTS 6,257,896 B1 * 7/2001 Fargano ...................... 434/322

FOREIGN PATENT DOCUMENTS

| JP | 56-100746 U | 8/1981 |
|---|---|---|
| JP | 61-102682 A | 5/1986 |
| JP | 10-161518 A | 6/1998 |

OTHER PUBLICATIONS

Hidetoshi Iida, et al., "Training of Speed Reading in English by Personal Computer," Technical Research Report, Institute of Electronics and Communication of Engineers of Japan, Sep. 30, 1983, vol. 83, No. 149, pp. 105–107 (*with partial translation*).

Akira Simizu, et al., "Application of a Personal Computer to the Rapid Reading of English Sentences," College Bulletin, Gifu National College of Technology, Japan, No. 20, pp. 89–94, issued on Mar. 20, 1985 (*with partial translation*).

Yoshitatsu Nomura et al., "A Training System for Fundamental Ability of Rapid Reading and its Evaluation," Proceedings of 25th Meeting for the Study of Intelligent Education Systems, Japan Society of Artificial Intelligence, Mar. 12, 1999 (*with partial translation*).

* cited by examiner

*Primary Examiner*—George B. Davis
(74) *Attorney, Agent, or Firm*—Birch, Stewart, Kolasch & Birch, LLP (57) ABSTRACT

A training/managing system and method of basic ability which enables objective and efficient management for improving the basic ability of persons by training toward some kind of target. The training/managing system of basic ability 1 is provided with training terminals 3-1 to 3-n for measuring/training ability to read characters of an employee to be trained, and a management device 4 which are connected to an information communicating network 2. The management device 4 is equipped with a data management server 5 for storing measured data in time-series; performing a predetermined arithmetical operation; and deriving management data, and a management terminal 7 for presenting the management data for a business administrator.

9 Claims, 6 Drawing Sheets

<MANAGEMENT DATA ON ABILITY TO READ> INDIVIDUAL

The reading speed of employee "A" is three times higher than the speed measured a month ago.
The time spent on reading per day of the employee "A" is three hours according to the basic value.

<RESULT>
¥2,999,200 (per year) spared.
① It means that the employee "A" has time to spare which can be allocated for working other than reading corresponding to the above amount of money. It is also equivalent to 1.6 times cost for hiring a part-time worker whose hourly rate is ¥1,000 for 8 hours per day for an year.
② It means that the employee "A" has come to have an ability deserving new annual income of ¥14,999,200.

<RESULT>
The present ability to read of the employee "A" is:
4680 (characters per minute)
78 (characters per second).

| AVERAGE OF COMPANY | |
| AVERAGE OF DEPARTMENT | |
| AVERAGE OF SECTION | |

Fig.9

SYSTEM AND METHOD FOR TRAINING/MANAGING BASIC ABILITY

BACKGROUND OF THE INVENTION

1. Field of the Invention

This invention relates to a system and method for training/managing basic ability. More particularly, this invention pertains to a system and method for training/managing the basic ability of persons by utilizing a information communication network.

2. Description of the Prior Art

A system or method for training the ability to read characters as one of the basic abilities of persons has already been realized. In such a system or method, a person individually undergoes certain training for improving the ability of their own, and therefore, the improvement of the ability depends on personal consciousness.

Such individual training without comparison with others tends to lack objectivity since the current status, degree of improvement and the like of his/her basic ability are only taken subjectively.

A company stipulated under the company law aims at profit, and thus, can not ignore operating effectiveness. Even though computerization is making progress, the operating effectiveness ultimately depends on the basic ability of each employee. As far as the improvement of his/her basic ability depends on the personal consciousness, it is difficult to improve efficiently the operating effectiveness.

Similarly, it is difficult for schools whose objective is to make examinees attain a target such as passing an entrance examination or a certifying examination to improve efficiently the examination pass rate, as far as the improvement of their basic ability depends only on the personal consciousness.

The employees or the examinees may obtain returns by improving the basic ability of their own. However, if the improvement depends only on the personal consciousness, it is difficult to improve the ability objectively and efficiently. Meanwhile, the management such as a company or a school is required to realize such objective and efficient improvement.

SUMMARY OF THE INVENTION

Therefore, it is an object of the present invention to provide a system and method for training/managing basic ability which enables objective and efficient management for improving the basic ability of persons by training toward some kind of target.

To attain the above object of the present invention and according to one aspect of the present invention, a training/managing system of basic ability for training and managing predetermined basic ability of a plurality of persons by utilizing a information communication network, comprises: a plurality of terminals connected to the information communication network; and a management device connected to the information communication network, the each terminal comprises: measurement means for measuring predetermined basic ability of each person; training means for carrying out training which applies loads for improving the predetermined basic ability of each person; the management device comprising: storage means for storing data measured by the measurement means on the predetermined basic ability of each person before and after the training by the training means; performing means for deriving management data by the predetermined arithmetical operation on the basis of the data stored in the storage means; and output means for outputting the management data performed by the performing means.

The data before and after the training of the predetermined basic ability of respective persons are stored via the information communication network. The management data is provided by performing the arithmetical operation on the basis of the stored data, whereby a comparison of the data becomes possible.

According to the present invention, the predetermined basic ability is an ability to read characters.

The ability to read characters is improved by the training and the management data on rapid reading is provided, whereby a comparison of the data becomes possible.

According to the present invention, the training means presents the same information for training at least three times, a first presentation time, a second presentation time, and a third presentation time being set in a long period of time, in a short period of time, and in an intermediate period of time, respectively.

The training method which has been found as a result of a dedicated study by the inventor can secure more efficient improvement of the predetermined basic ability. As a result, more advanced management data is provided, thereby enabling an advanced comparison of the data.

According to the present invention, the management device provides the management data for a business administrator by the output means; and the performing means performs the arithmetical operation for deriving an hourly rate of each person as an employee to be trained from his/her annual income and working hours; finds time to spare which is assumed to be earned by improving the predetermined basic ability after the training, on the basis of comparison between the data measured before and after the training; and derives the management data wherein degree of effect of training is represented in terms of an amount of money equivalent to the time assumed to be allocated for work using other basic ability of the employee, by utilizing the hourly rate and the assumed time to spare.

The management data wherein the degree of effect of the training is represented in terms of the amount of money equivalent to the time assumed to be allocated for the work using other basic ability. As a result, a business administrator can not only realize the degree of effect of the training of one employee, but also compare with that of other employees with the familiar sense. Moreover, since the management data represents the man power earned by the training in terms of the amount of money, the business administrator can obtain information for making a decision in the case of human investment.

According to the present invention, the management device provides the management data to the business administrator by the output means; and the performing means performs the arithmetical operation for deriving an hourly rate of each person as an employee to be trained from his/her annual income and working hours; finds time to spare which is assumed to be earned by improving the predetermined basic ability after the training, on the basis of the comparison between the data measured before and after the training; and derives the management data wherein degree of effect of training is represented in terms of new annual income of the employee to be assumed after the training, by utilizing the hourly rate and the assumed time to spare.

Since the management data wherein the degree of effect of the training is represented in terms of new annual income of the employee to be assumed after the training, the business administrator can realize the degree of effect of the training of the employee and compare with that of other employees with the familiar sense. Moreover, the management data represents human productivity raised and obtained by the training in terms of the amount of money, the business administrator can obtain information for evaluation of the employee.

According to the present invention, the storage means stores the data measured before and after the training with identification as to which group the person belongs to, when each person belongs to one of a plurality of groups; and the performing means performs a predetermined arithmetical operation based on the stored data to derive group management data. In this case, the group management data may be an average value for the persons belonging to each group.

The management such as the business administrator or the school, can compare among individuals, and further, an individual with a group, and among groups based on the management data of the groups.

According to another aspect of the present invention, a training/managing method of basic ability for training and managing predetermined basic ability of a plurality of persons by utilizing a information communication network, comprises the steps of: measuring predetermined basic ability of each person in respective terminals connected to the information communication network; storing data measured before a training in a server connected to the information communication network; carrying out the training which applies loads for improving the predetermined basic ability of each person and measuring the basic ability after the training in the terminal; storing data measured after the training in the server; deriving management data by a predetermined arithmetical operation on the basis of the data measured before and after the training; and outputting the derived management data.

The data before and after the training on the predetermined basic ability of persons are stored via the information communication network, and the management data is provided by performing the arithmetical operation on the basis of the stored data, whereby a comparison becomes possible.

According to the present invention, the storage means stores the data measured before and after the training with identification as to which group the person belongs to, when each person belongs to one of a plurality of groups; and
  the performing means performs a predetermined arithmetical operation based on the stored data to derive a group management data.

The management such as the business administrator or the school, can compare among individuals, and further, an individual with a group, and among groups based on the management data of the groups.

BRIEF DESCRIPTION OF THE DRAWINGS

The invention will be explained in more detail in conjunction with appended drawings, wherein.

DETAILED DESCRIPTION OF A PREFERRED EMBODIMENT

Referring to drawings, a preferred embodiment of the present invention will be described below.

Figure 1:
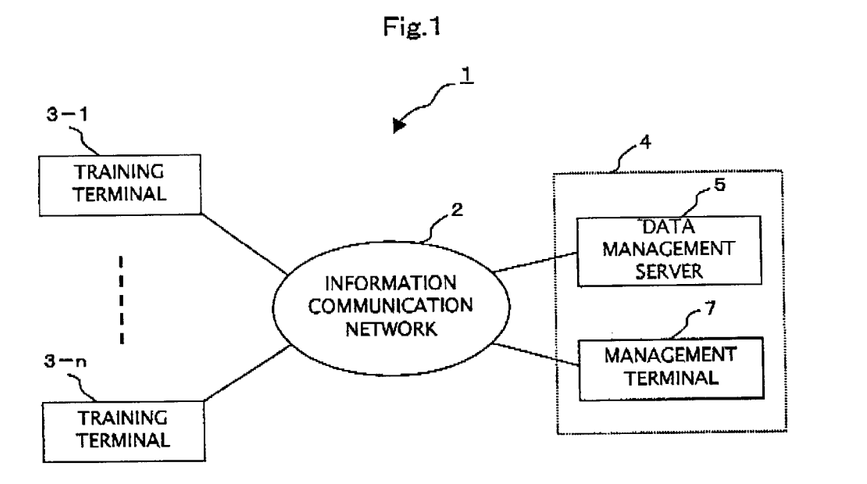
FIG. 1 is a block diagram showing conception of a system for training/managing basic ability according to the preferred embodiment of the present invention.
Figure 2:
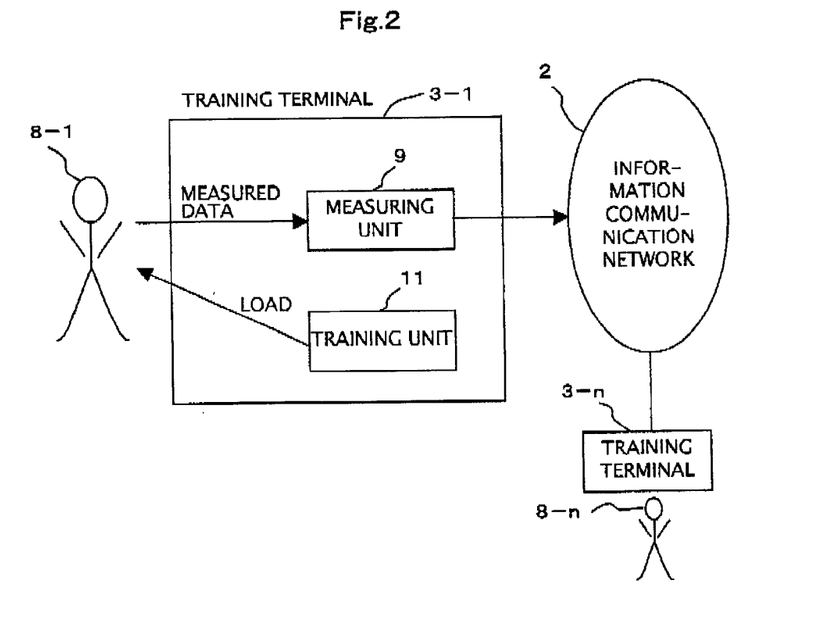
FIG. 2 is a block diagram showing internal configuration of a training terminal shown in FIG. 1.
Figure 3:
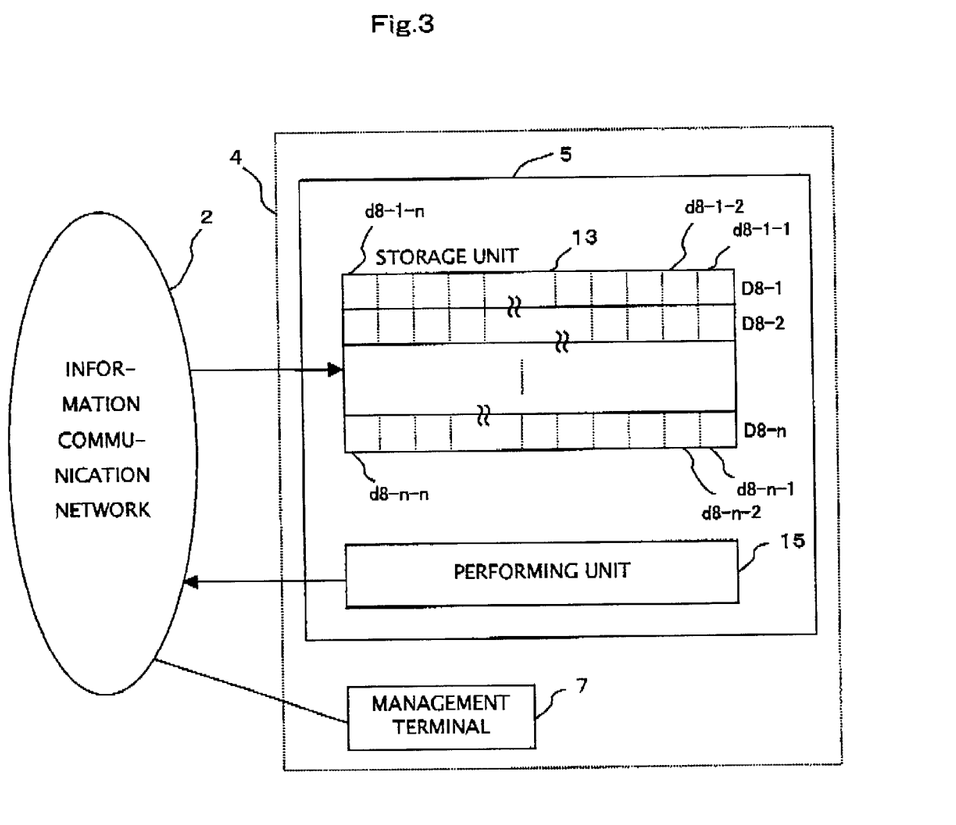
FIG. 3 is a block diagram showing internal configuration of a management server shown in FIG. 1.

FIG. 1 is a block diagram showing conception of a system for training/managing basic ability according to a preferred embodiment of the present invention. FIG. 2 is a block diagram showing internal configuration of a training terminal shown in FIG. 1. FIG. 3 is a block diagram showing internal configuration of a data management server shown in FIG. 1.

Referring to FIG. 1, the system for training/managing basic ability 1 will be described. The system 1 utilizes an information communication network 2 and is provided with training terminals 3-1 to 3-$n$ and a management device 4 which are connected to the information communication network 2. The management device 4 comprises a data management server 5 and a management terminal 7, which are connected to the information communication network 2.

Referring to FIG. 2, a further description will be made of the training terminals 3-1 to 3-$n$. The training terminal 3-1 is equipped with a measuring unit 9 and a training unit 11. The measuring unit 9 measures the predetermined basic ability, specifically, an ability to read characters of an employee 8-1 to be trained at the company which introduces the system 1. The training unit 11 loads the employee 8-1 with a training of the ability to read characters. The measuring unit 9 measures the ability to read before and after the training and outputs the measured data to the management device 4 via the information communication network 2.

Referring to FIG. 3, the management device 4 will be described in detail. The data management server 5 of the management device 4 is equipped with a storage unit 13 and performing unit 15. For storing the measured data of the employees 8-1 to 8-$n$ output from each of the training terminals 3-1 to 3-$n$, the storage unit 13 has a plurality of data storage areas including data storage area D8-1 corresponding to the employee 8-1, data storage area D8-2 corresponding to the employee 8-2, . . . , and data storage area D8-$n$ corresponding to the employee 8-$n$.

Each data storage area stores time-series data, that is to say, the data storage area D8-1 stores time-series data d8-1-1, d8-1-2, . . . , and d8-1-$n$, and the data storage area D8-$n$ stores time-series data d8-$n$-1, d8-$n$-2, . . . , and d8-$n$-$n$, respectively. The time-series data are such data that each employee's progress in the training is recorded. The data measured before starting the training is the first time-series data as a reference value, and then, the data measured periodically e.g. once a month becomes the subsequent time-series data.

The performing unit 15 performs after-mentioned predetermined arithmetical operation on the basis of the time-series data d8-1-1 to d8-$n$-$n$ corresponding to respective employees 8-1 to 8-*n* stored in the storage unit 13, and derives management data.

The management data is transmitted via information communication network 2 to the management terminal 7. The management such as a business administrator can see the management data output to a display or the like.

Figure 4:
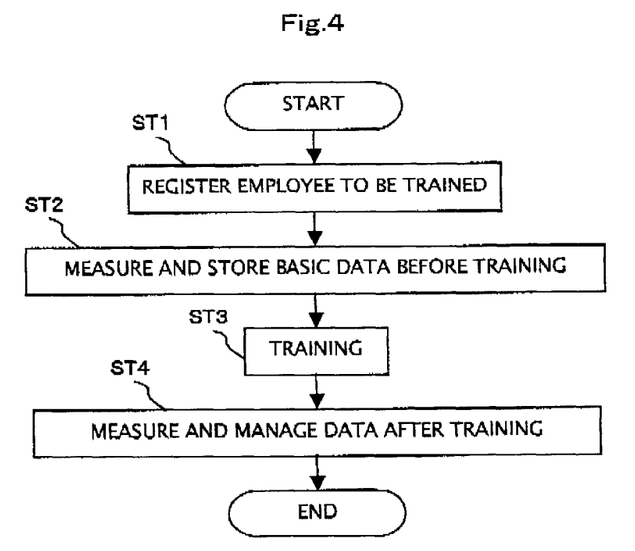
FIG. 4 is a flow chart illustrating the operation of the system shown in FIG. 1.

FIG. 4 is a flow chart illustrating operation of the system shown in FIG. 1.

Figure 5:
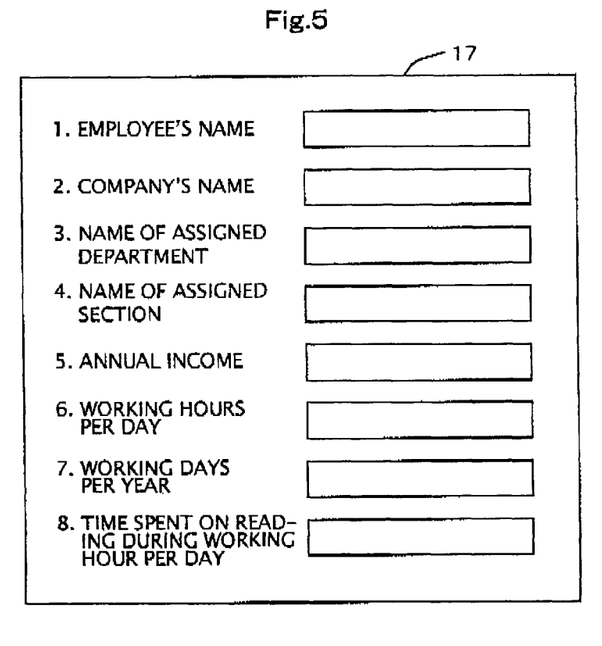
FIG. 5 is a view showing an example of screen for registration of an employee to be trained.

At step ST1, the company has the employees to be trained register themselves. The registration is performed with each of the training terminals 3-1 to 3-*n* on a screen 17 for registration as shown in FIG. 5. The necessary data to be input are employee's name, company's name, name of assigned department or section, annual income, working hours per day, working days per year and time spent on reading during the working hour per day.

The employee's name is required for identification when compared with other employees. The company's name is required on comparing the management data with those of other companies. The name of assigned department or section is required for comparing the data with those of other departments or sections, and to identify the division to which employee "A" belongs. The annual income is required to provide the management data for training in an objective and effective manner, so that a representation of the management data in terms of an amount of money with which the management such as the business administrator is familiar becomes possible.

The working hours per day and the working days per year are required since they are necessary for deriving the management data which represents the degree of improvement of the ability in terms of an amount of money. The time spent on reading during the working hour per day is required to apply identical terms to employees for deriving the management data on the ability to read characters as one of the basic abilities.

With respect to the above-mentioned data, if a system does not compare the management data with those of other companies, the company's name is not required to be input. Similarly, the name of assigned department or section is not necessarily required to be input depending on the system.

Further, other than the time spent on reading during the working hour per day which must be informed by the employee in person, the data of the company's name, the name of assigned department or section which are collected by a personnel department, and the data of the annual income, the working hours per day, the working days per year which are collected by a labor department, may be utilized to simplify the data input. In short, referring to the employee number which is on an employment roll, the necessary data may be acquired from the personnel department and the labor department or the like, while the time spent on reading during the working hour per day may be informed by the employee. In such a case, the employee is merely required to input the employee number and the time spent on reading during the working hour per day on a screen 17 for registration.

Next, with regard to the employee "A", assuming that the annual income is ¥12,000,000; the working hours per day are 8 hours; the working days per year are 230 days; and the time spent on reading during the working hour per day is 3 hours, the operation of the system will be described hereinafter in more detail.

At step ST2, the ability to read characters of the employee "A" before starting the training is measured and stored as the basic data.

Figure 6:
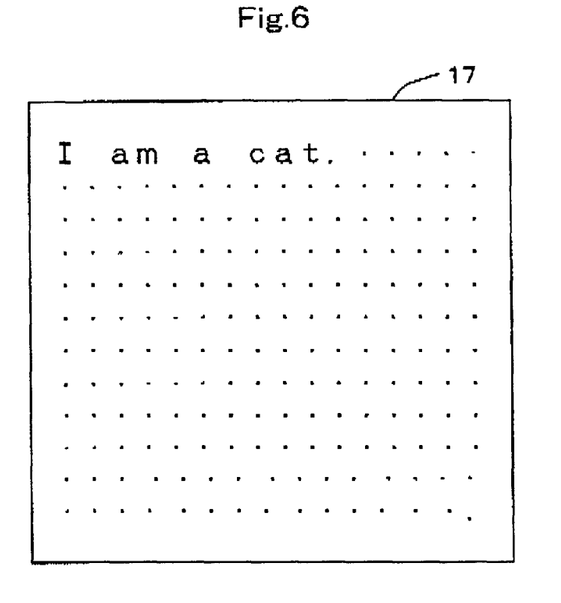
FIG. 6 is a view showing an example of screen for measuring an ability to read characters of an employee.
Figure 7:
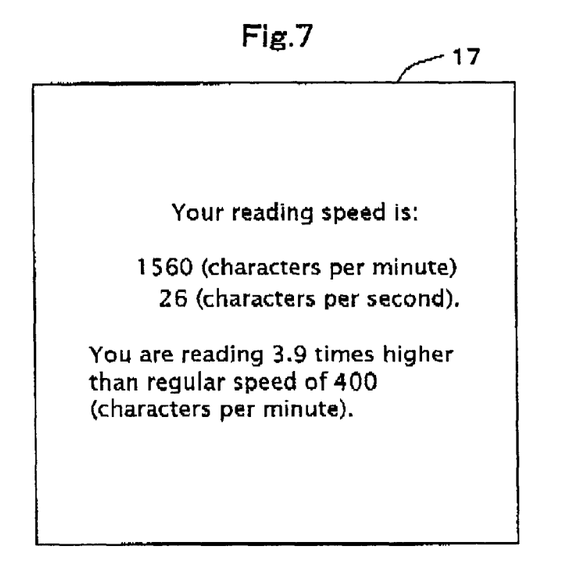
FIG. 7 is a view showing an example of screen which displays an result of an ability to read characters of the employee measured.

The measuring method is here described. The message "Please press the space key and start reading the sentences displayed. When finished, please press the space key again," is displayed on the screen 17 for measurement of each of the training terminals 3-1 to 3-*n*. When the employee "A" presses the space key in accordance with the instructions, sentences such as "I am a cat. . . . " is displayed on the screen 17 as shown in FIG. 6. When the space key is pressed again after the completion of reading, the screen displaying a measurement result as shown in FIG. 7 is displayed.

The measured data is transmitted via the information communication network 2 to the management device 4 as a reference value before starting the training, and the storage unit 13 of the data management server 5 stores the data as one of the time-series data.

At step ST3, the employee "A" undergoes the training for improving the ability to read characters. The training is carried out in such a manner that it applies loads to the employee "A".

An example of such training methods which has been found as a result of a dedicated study is now described. Sentences are scrolled on the screen at a speed lightly loading the employee "A", who reads sentences while making an effort to keep up with the speed.

The speed is set on the basis of the data measured before the training being carried out, specifically, the reference value or the latest measured data. In short, the speed which seems to be difficult to keep up with is set.

Next, the same sentences are scrolled at a speed heavily loading the employee "A". The employee "A" reads the sentence while making an effort to keep up with the speed which seems to be almost impossible to keep up with.

Further, the same sentences are scrolled at an intermediate speed between the first speed and the second speed. The employee "A" reads the sentence while making an effort to keep up with the speed. Although the speed loads the employee "A" heavier than the first speed, it may seem to be easy for the employee "A" who has experienced the second speed higher than the present speed.

In short, the time for the employee "A" to read the sentences being scrolled is set in a long period of time for the first time, in a short period of time for the second time, and in an intermediate period of time for the third time. The speed is set low, high, and intermediate, respectively.

Needless to say, the training is not limited to the above, and a training for widening the visual field or combination of various trainings may be carried out.

At step ST4, the data after the training is measured and stored. The management data derived by the performing unit 15 is output to the management terminal 7 wherein the management is conducted.

A derivation method of the management data implemented by the performing unit 15 will be described hereinafter.

First of all, an hourly rate of the employee "A" is calculated. The total working hours per year are 1,840 (hours) [=8 (hours per day)×230 (days per year)] and the annual income is ¥12,000,000. Whereat, the hourly rate of the employee "A" is about ¥6,520 (per hour) [=¥12,000,000 (per year)÷1,840 (hours per year)].

If the reading speed is improved three times higher than the reference value measured before starting the training, the employee "A", who spent 3 hours during the working hour per day for reading, is able to read the same quantity in 1 hour. Consequently, 2 hours to spare can be used for work other than reading.

The above result is converted into an amount of money. Since 2 hours (per day) [=3 hours (per day)−1 hour (per day)] can be used for the work other than reading, ¥2,999,200 (per year) [=2 (hours per day)×230 (days per year)×6,520 (yen per hour)] is derived.

Figure 8:
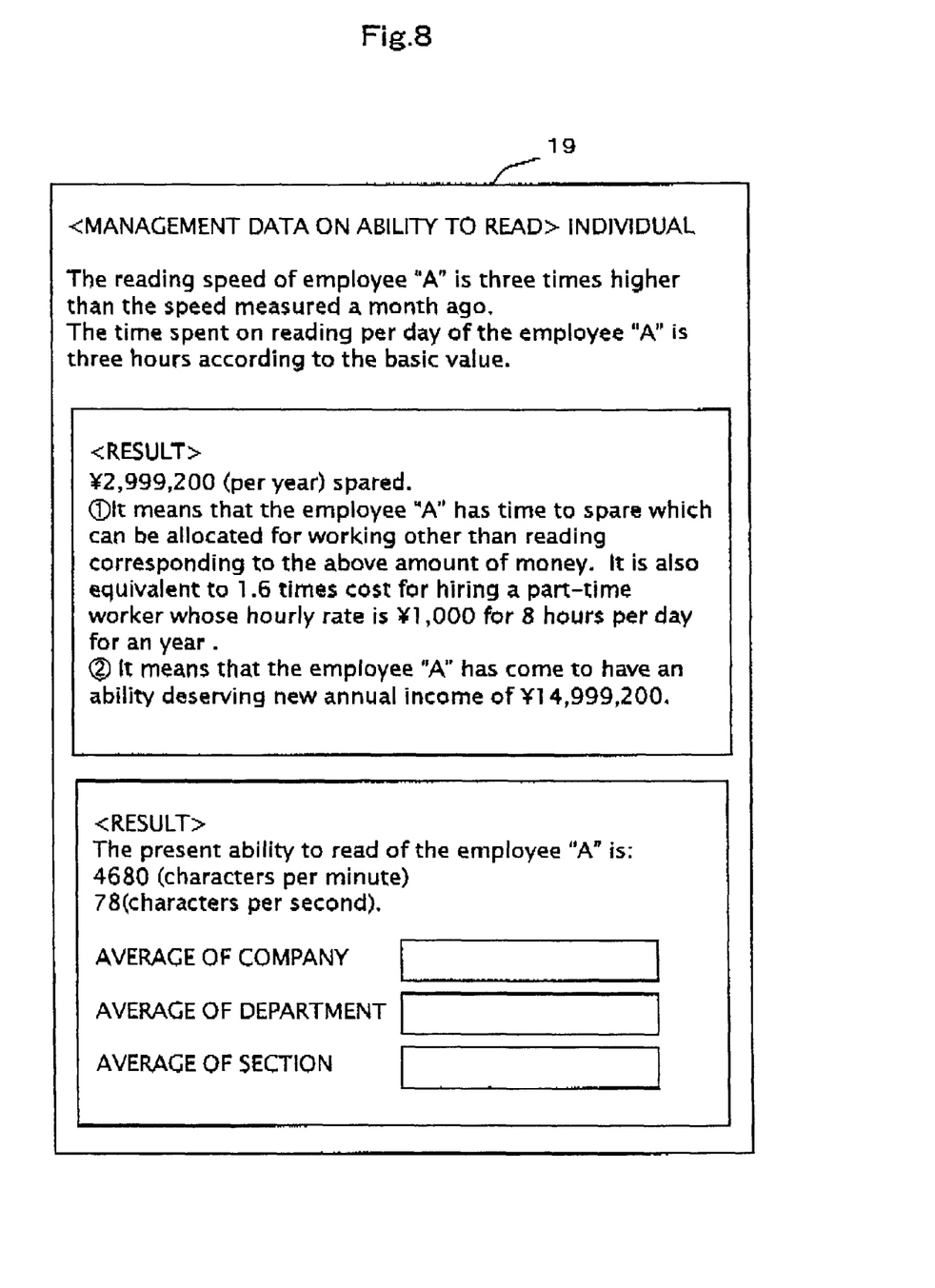
FIG. 8 is a view showing an example of management data output in a management terminal.

FIG. 8 shows an example of management data output by the management terminal.

By the arithmetical operation mentioned above, the management data is displayed on the screen 19 of the management terminal 7 and is presented to management such as business administrator.

The management data which shows the degree of improvement of the ability such that the reading speed becomes three times higher than the reference value, or the management data which shows the present ability by the number of characters to be read in 1 minute, tends to be one-sided data. According to the present invention, an arithmetical operation is performed with management information, which takes one's income into consideration and is converted into the amount of money as objective management data, whereby a comparison with others becomes possible. The management such as a business administrator can manage for improving the basic ability (ability to read characters in this embodiment) of employees objectively and efficiently by training toward the target of improvement in operational efficiency in the company. Consequently, the managerial responsibilities of the business administrator may be fulfilled by pertinent management, while a desire for self-actualization of an employee who wishes to improve his/her basic ability by the training may be satisfied.

The more effective the training method is, the more advanced management data can be obtained by the management, and a more advanced comparison becomes possible. Therefore, the responsibility of the business administrator is more sufficiently fulfilled by the pertinent management, while a desire for self-actualization of an employee who undergoes training may be more adequately satisfied.

FIG. 8 shows two kinds of management data which explain the spared amount of money ¥2,999,200.

The first explanation indicates that the above amount of money is equivalent to 1.6 times cost for hiring a part-time worker whose hourly rate is ¥1,000 for 8 hours per day for a year.

This management data represents the degree of effect of the training in terms of an amount of money. The business administrator can realize the degree of effect of the training of an employee and compare with that of other employees with the familiar sense. Moreover, the management data represents the man power spared by the training in terms of the amount of money, the business administrator can obtain information for making a decision in the case of human investment.

On the other hand, an employee who undergoes the training, may shorten the overtime work and earn spare time thereby having a comfortable life in return for the self-actualization.

The second explanation indicates that the employee "A" has come to have an ability deserving new annual income of ¥14,999,200.

This management data also represents the degree of effect of the training in terms of an amount of money. The business administrator can realize the degree of effect of the training of an employee and compare with that of other employees with the familiar sense. Moreover, the management data represents human productivity raised and obtained by the training in the amount of money, the business administrator can obtain information for evaluation of the employees.

On the other hand, an employee who undergoes the training, may have a rise in salary in return for the self-actualization.

Meanwhile, the present ability to read characters of the employee "A" is displayed as measured data as well as the average of the company, and that of the department or the section to which the employee "A" belongs. Accordingly, the business administrator may compare the employee "A" with not only other employees but also the average of the group when the degree of effect of training is compared as mentioned above.

The comparison between the employee "A" and other employees can be made based on both the degree of effect of training and the present ability as well as the comparison of the employee "A" with the average of the group. The format of the management data for the comparison may be the data similar to the measurement data, the data converted into the amount of money, or the data in other formats.

Figure 9:
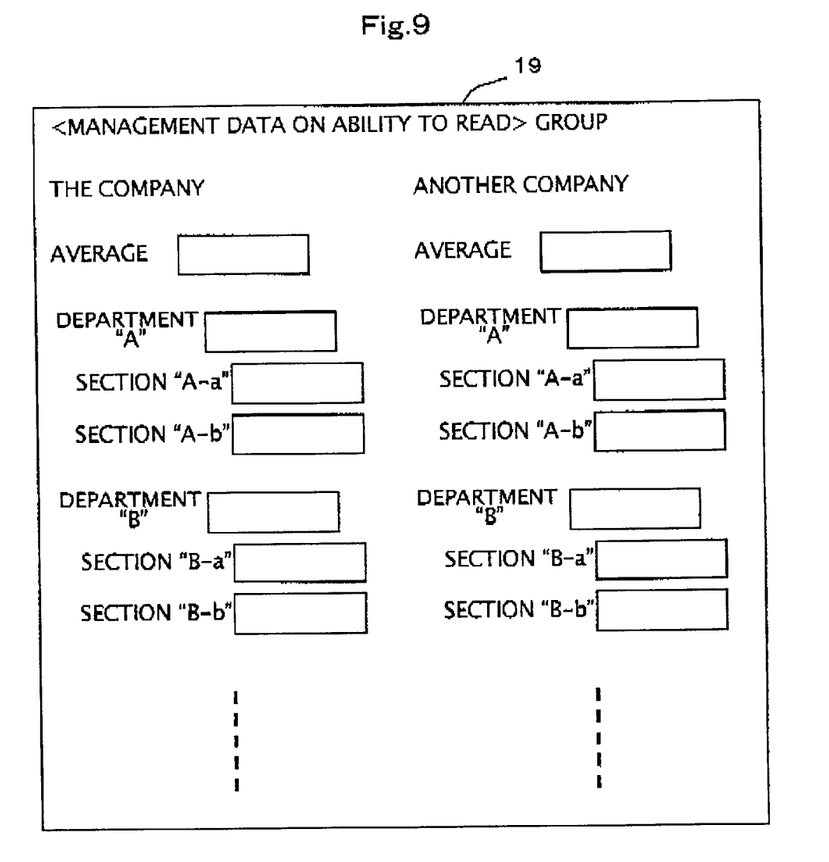
FIG. 9 is a view showing another example of the management data output in the management terminal.

FIG. 9 shows another example of the management data output by the management terminal.

The management data represents the average of its own company and those of other companies as well as the average of each department or section of each company. The average of the data may be based either on the present ability such as the ability to read characters in 1 minute or in 1 second as shown in FIG. 7, or the data representing the degree of improvement of the ability in terms of yearly amount of money. That is, the data may be derived either from the present ability or the degree of effect of the training. In short, the average which is calculated based on the reference value set for the comparison is available for the management data.

The management can find the improvements to be made from a comparison between its own company and other companies, and a comparison among departments or sections in the company. Therefore, not only individual management but also group management becomes possible thereby enabling the management in a broader perspective. Also, a sense of purpose as a group may be grown among the managed group members, and the basic ability may be improved further due to group psychology.

As described above, a business administrator of the management can compare either the present ability or the degree of effect of the training among individuals, individual with the group, and among groups by using the management data based on the time-series data, so that the appropriate management becomes possible.

In the above embodiment, the ability to read characters was described as the human basic ability but other abilities may be applied.

In the above embodiment, the degree of improvement of the ability is derived on the basis of the measured data before starting the training, i.e. the reference value. However, the degree of improvement of the ability may be derived in such a manner that the latest measured data is set as the reference value. Further, the annual income may fluctuate annually, so that the reference value may be set annually to conduct management of one-year cycle.

In the above embodiment, the case where a company introduces the system was described as an example. The system may be introduced to schools or the like. In such a case, the system is useful for the management for improving the basic ability of persons objectively and efficiently by training toward the target such as passing an entrance examination or a certifying examination. The improvements to be made can be found by a comparison with other schools, and comparison among classes based on the group management data.

Further, the system may be utilized for the comparison among the administrative divisions or the nations.

In the embodiment stated above, the data management server is equipped with the storage unit and the performing unit, while the management terminal is equipped with the output unit. Alternatively, the management terminal may be equipped with the performing unit and the output unit. As far as is provided with the necessary components, the system may be modified.

As mentioned above, according to the system and method for training/managing basic ability of the present invention, the data before and after the training are measured on the predetermined basic ability, e.g., an ability to read characters, of a plurality of persons via the information communication network. The management data is provided by performing the arithmetical operation on the basis of the data. By comparing the management data, the management for improving the basic ability of persons objectively and efficiently by training toward some kind of target such as improvement of the operating effectiveness, passing the entrance examination or the certifying examination, and the like, becomes possible. When the training method which has been found as a result of the dedicated study by the inventor is implemented, it is possible to improve efficiently the predetermined basic ability and obtain more advanced management data, thereby enabling advanced comparison of the data. Consequently, the managerial responsibilities of the business administrator may be fulfilled by pertinent management, while the desire for self-actualization of the employee who wishes to improve his/her basic ability by training may be satisfied.

In addition, a business administrator can realize the degree of effect of the training of the employee and compare with that of other employees with the familiar sense, because the management data is represented in terms of the amount of money. The management data represents the man power earned by the training so that the business administrator can obtain information for making a decision in the case of human investment. The management data also represents human productivity raised and obtained by the training in the amount of money so that the business administrator can obtain information for evaluation of the employee. Consequently, the managerial responsibilities of the business administrator may be further fulfilled by more pertinent management while the employee who undergoes training, may earn spare time and have a rise in salary in return for the self-actualization.

Moreover, the management such as the business administrator or the school, can compare among individuals, the individual with the group, and among groups by the average of the group as the group management data. Consequently, not only individual management but also group management become possible thereby enabling the management in a broader perspective. Also, sense of purpose as the group may be grown among the managed group members and the basic ability may be improved further due to group psychology.

The preferred embodiment of the present invention has been disclosed by way of example and it will be understood that other modifications may occur to those skilled in the art without departing from the scope and the spirit of the appended claims.

What is claimed is:

1. A training/managing system of basic ability for training and managing predetermined basic ability of a plurality of persons by utilizing a information communication network, comprising:
    a plurality of terminals connected to said information communication network; and
    a management device connected to said information communication network, said each terminal comprising:
        measurement means for measuring predetermined basic ability of each person;
        training means for carrying out training which applies loads for improving the predetermined basic ability of each person;
    said management device comprising:
        storage means for storing data measured by said measurement means on the predetermined basic ability of each person before and after the training by said training means;
        performing means for deriving management data by the predetermined arithmetical operation on the basis of said data stored in said storage means; and
        output means for outputting said management data performed by said performing means.

2. The training/managing system of basic ability according to claim 1, wherein said predetermined basic ability is an ability to read characters.

3. The training/managing system of basic ability according to claims 1 or 2, wherein said training means presents the same information for training at least three times, a first presentation time, a second presentation time, and a third presentation time being set in a long period of time, in a short period of time, and in an intermediate period of time, respectively.

4. The training/managing system of basic ability according to claim 1, wherein:
    said management device provides the management data for a business administrator by said output means; and
    said performing means performs the arithmetical operation for deriving an hourly rate of each person as an employee to be trained from his/her annual income and working hours;
    finds time to spare which is assumed to be earned by improving the predetermined basic ability after the training, on the basis of comparison between the data measured before and after the training; and
    derives the management data wherein degree of effect of training is represented in terms of an amount of money equivalent to the time assumed to be allocated for work using other basic ability of said employee, by utilizing said hourly rate and said assumed time to spare.

5. The training/managing system of basic ability according to claim 1, wherein:
    said management device provides the management data to the business administrator by said output means; and
    said performing means performs the arithmetical operation for deriving an hourly rate of each person as an employee to be trained from his/her annual income and working hours;
    finds time to spare which is assumed to be earned by improving the predetermined basic ability after the training, on the basis of the comparison between the data measured before and after the training; and derives the management data wherein degree of effect of training is represented in terms of new annual income of said employee to be assumed after the training, by utilizing said hourly rate and said assumed time to spare.

6. The training/managing system of basic ability according to any one of claims 1, 4 or 5, wherein:

said storage means stores said data measured before and after the training with identification as to which group the person belongs to, when each person belongs to one of a plurality of groups; and said performing means performs a predetermined arithmetical operation based on said stored data to derive group management data.

7. The training/managing system of basic ability according to claim 6, wherein said performing means derives an average value for the persons belonging to each group as the group management data.

8. A training/managing method of basic ability for training and managing predetermined basic ability of a plurality of persons by utilizing a information communication network, comprising the steps of:

measuring predetermined basic ability of each person in respective terminals connected to said information communication network;

storing data measured before a training in a server connected to said information communication network;

carrying out the training which applies loads for improving the predetermined basic ability of each person and measuring the basic ability after the training in said terminal;

storing data measured after the training in said server;

deriving management data by a predetermined arithmetical operation on the basis of the data measured before and after the training; and outputting said derived management data.

9. The training/managing method of basic ability according to claim 8, wherein:

said storage means stores said data measured before and after the training with identification as to which group the person belongs to, when each person belongs to one of a plurality of groups; and said performing means performs a predetermined arithmetical operation based on said stored data to derive a group management data.

* * * * *

UNITED STATES PATENT AND TRADEMARK OFFICE
CERTIFICATE OF CORRECTION

PATENT NO. : 6,764,311 B2
DATED : July 20, 2004
INVENTOR(S) : Akihiro Kawamura

It is certified that error appears in the above-identified patent and that said Letters Patent is hereby corrected as shown below:

<u>Title page,</u>
Item [76], change
"[76] Inventor: Akihiro Kawamura, 405-8 Minami-iizuka, Oamishirasato-machi, Sanbu-gun, Chiba-ken (JP)" to
-- [76] Inventor: Akihiro Kawamura, 5-3-10-102, Yashio, Shinagawa-ku, Tokyo (JP) --

Signed and Sealed this

Sixteenth Day of November, 2004

JON W. DUDAS
*Director of the United States Patent and Trademark Office*